Feb. 17, 1931.  P. D. MacLELLAN  1,792,916
CONDIMENT HOLDER
Filed Aug. 14, 1929

Inventor
Peter D. MacLellan,

By *Clarence A. O'Brien*
Attorney

Patented Feb. 17, 1931

1,792,916

UNITED STATES PATENT OFFICE

PETER D. MacLELLAN, OF DENVER, COLORADO

CONDIMENT HOLDER

Application filed August 14, 1929. Serial No. 385,708.

This invention relates broadly to condiment holders, and has as its primary object the provision of a combination salt and pepper shaker, the same comprising a single container divided into two compartments, one compartment for the salt, the other for the pepper, and said container being open at its top, a closure for the open top of the container, said closure being of such shape and so constructed as to constitute a continuation of the compartment formed in the container, and the closure at its opposite end being provided with apertures, the apertures at one end being relatively large and communicating with the compartment wherein the salt is contained, whereby the salt may be discharged through the perforations when the container is shaken in the usual manner, while at its opposite end the shaker is provided with relatively smaller perforations communicating with the compartment containing the pepper whereupon under like operation, the pepper may be discharged through the smaller perforations, without danger of the salt being discharged through its perforations in the closure.

A still further object of the invention is to provide a condiment holder in the nature of a combination salt and pepper shaker, wherein the container for the salt and pepper is provided with a vertical transverse partition member for dividing the container into said compartments and a closure for the container, said closure being provided with a partition adapted for rest upon the partition member of the container thus forming therewith a continual partition whereby at all times the salt and pepper will be arranged in a compartment free of contact with one another, and the closure being provided at opposite ends with apertures of suitable diameter to permit of the ready discharge therethrough of the salt or pepper dependent of course upon which is to be used without the danger of having the other discharged through its perforations at the same time.

A still further object of the invention is to provide a condiment holder of the character above mentioned, which is comparatively simple in construction, will obviate any necessity of a guard to prevent the salt and pepper from being shaken out of the container simultaneously, which feature will materially and substantially work toward the simplicity of manufacture and operation of the holder.

Figure 1:
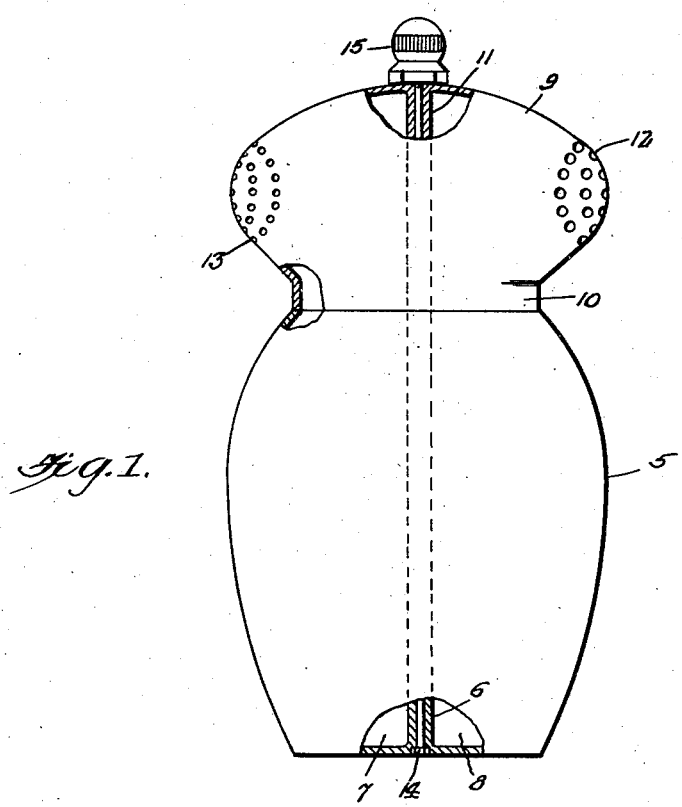
Figure 2:
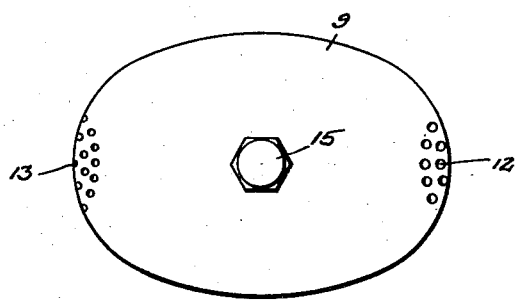

Other objects and advantages of the invention will become apparent during a study of the following description, taken in connection with the accompanying drawings, wherein:

Figure 1 is a view partly in section, partly in elevation, of a condiment holder constructed in accordance with the present invention, Figure 2 is a top plan view thereof.

With reference more in detail to the drawings, it will be seen my condiment holder comprises a container designated generally by the reference character 5, and that this container may be of any suitable size or shape. However as shown the container 5 is of somewhat ovate configuration in cross section, and gradually tapers from a point intermediate its length end to the bottom of the container.

This container is preferably opened at the top, while arranged within the said container 5 is a partition member 6, said partition member 6 extending transversely of the container and being disposed vertically therein. Preferably the upper edge of the partition member 6 terminates substantially flush with the upper edge of the said container.

The partition member 6 divides the container into a salt compartment 7 and a pepper compartment 8.

For closing the open end of the container 5 there is provided a substantially bulbuous shaped closure member 9, this closure member 9 being of such configuration as to taper toward its opposite end and at its bottom or lower edge is provided with a reduced entrance neck 10. The lower edge of the neck 10 is adapted to rest upon the upper edge of the container 5. The diameter of the neck 10 is equal to the diameter of the opening in the top of said container 5.

The closure 9 is also provided with a vertically disposed transverse partition 11, the lower edge of which partition 11 is substantially flush with the lower edge of the neck 10. Said partition member 11 is adapted for rest at its lower edge upon the upper edge of the partition member 6 and in longitudinal alinement therewith, whereby the sections or compartments formed by said partition member 11 in the closure 9 will as it were provide a continuation of the salt and pepper compartments 7 and 8 respectively of the container 5.

At one reduced end the closure is provided with relatively large perforations 12, through which the salt within the compartment 8, when conveyed to the registering compartment in the cap 9 may be discharged through these perforations when the holder is shaken in the usual manner.

Likewise, at its opposite reduced end, the cap 9 is provided with a series of relatively smaller perforations 13, through which the salt may be discharged or shaken in substantially the same manner as would be employed for discharging the pepper.

For maintaining the closure 9 upon the container 5, and the partition members 6 and 11 respectively in longitudinal alinement, a tie rod or bolt 14 extends longitudinally through the said partition members. At its lower end the tie rod is anchored within the bottom of the container 5 as shown to advantage in Figure 1, while at its upper end the rod projects for a desired extent beyond the closure 9, and the extended end of the tie rod or bolt 14 is threaded for the reception of a suitably knurled finger knob or nut 15, which knob 15 when threaded on the tie rod will of course press downwardly against the closure 9 thus maintaining the entire condiment holder in assembled position.

From the foregoing then it will be seen that I have evolved a simple, yet thoroughly practical and efficient condiment holder wherein the same is capable of containing salt and pepper and from which either may be discharged, without endangering of one simultaneous seasoning.

It will also be appreciated, having constructed a condiment holder in this manner, the necessity of a guard for preventing the discharge of the salt for example while the pepper is being discharged, and vice versa is obviated, thus rendering a device of a simple yet thoroughly practical nature, compact, and which may be manufactured and retailed at a nominal cost.

Minor changes coming within the field of invention may be resorted to, but:

What I claim and desire to secure by Letters Patent is:

In a condiment holder, an open top container, a vertical transverse partition member in the container for dividing the latter into a salt compartment and a pepper compartment, a substantially bulbous shaped closure for the open top of the container, said closure being provided with a reduced neck, having its lower edge adapted for disposition on the upper edge of said container, a partition member arranged vertically and transversely within the closure and adapted for rest upon the upper edge of the first mentioned partition member, said closure having one reduced end thereof provided with relatively large perforations whereby the salt may be discharged therethrough and the other reduced end of said closure being provided with relatively small perforations whereby pepper may be discharged therethrough, a tie bolt extending vertically through said partition members, said bolt having one end thereof projecting beyond said closure, and a knurled finger knob threaded on said one end for engagement with said closure for retaining the latter in position upon said container.

In testimony whereof I affix my signature.

PETER D. MacLELLAN.